United States Patent [19]
Tsuji et al.

[11] Patent Number: 5,684,383
[45] Date of Patent: Nov. 4, 1997

[54] REGENERATIVE CHARGE CONTROL SYSTEM ESTIMATING ALLOWABLE REGENERATIVE POWER

[75] Inventors: Tadashi Tsuji; Tsuyoshi Sodeno, both of Kanagawa-ken, Japan

[73] Assignee: Nissan Motor Co., Ltd., Yokohama, Japan

[21] Appl. No.: 706,771

[22] Filed: Sep. 3, 1996

[30] Foreign Application Priority Data

Sep. 19, 1995 [JP] Japan ................. 7-239628

[51] Int. Cl.$^6$ .................. H01M 10/44; H01M 10/46
[52] U.S. Cl. .................. 320/5; 320/13; 320/62
[58] Field of Search .................. 320/5, 9, 10, 11, 320/12, 13, 14, 29, 31, 49, 62

[56] References Cited

U.S. PATENT DOCUMENTS 5,412,251  5/1995  Furutani et al. .................. 320/62 X
5,446,365  8/1995  Nomura et al. .................. 320/14

*Primary Examiner*—Edward Tso
*Attorney, Agent, or Firm*—Foley & Lardner

[57] ABSTRACT

A regenerative charge control system includes a cell, an inverter for converting a discharge power of the cell into a load driving force when a load is driven and for inverting the load driving force into the discharge power of the cell when the power is regenerated by the load, a voltage sensor for detecting a voltage between both ends of the cell, a current sensor for detecting a current passing through the cell, and a controller for measuring a discharge voltage and a discharge current of the cell by means of the voltage and current sensors when the load is driven. The controller estimates an allowable regenerative power when the power is regenerated on the basis of the measured results, and controls the charging power of the cell when the power is regenerated so as not to exceed the allowable regenerative power.

15 Claims, 5 Drawing Sheets

DEPTH OF DISCHARGE (DOD)

| NO | $I_1 \sim I_2$ | $\sim I_3$ | $\sim I_4$ | $\sim I_5$ | $\sim I_6$ |
|----|----------------|------------|------------|------------|------------|
| 1  | $i_1, v_1$     | $i_3, v_3$ | $i_2, v_2$ | $i_6, v_6$ |            |
| 2  |                | $i_4, v_4$ | $i_7, v_7$ |            |            |
| 3  |                | $i_5, v_5$ |            |            |            |

REGENERATIVE CHARGE CONTROL SYSTEM ESTIMATING ALLOWABLE REGENERATIVE POWER

BACKGROUND OF THE INVENTION

1. Field of The Invention

The present invention relates to a regenerative charge control system for controlling the charge of a cell by a regenerative power.

2. Description of The Related Art

In an electric automotive vehicle, when a load is driven, the discharge power of a cell is supplied to a motor via an inverter to produce the traveling energy of the vehicle. When the vehicle is stopped, the cell is usually connected to a charger to be charged. When the electric power is regenerated during the traveling of the vehicle, the traveling energy of the vehicle is inverted to an electrical energy via the motor and the inverter so as to charge the cell and to apply the regenerative braking to the vehicle.

In order to prevent the deterioration of the cell due to the impression of a charging voltage greater than an allowable value, the electric power during the regenerative charge of the cell is restricted by the depth of discharge (which will be hereinafter referred to as "DOD"), the temperature of the cell, the deteriorated state of the cell and so forth.

Therefore, in conventional regenerative charge control systems for electric automotive vehicles, a DOD-allowable regenerative power map representative of the relationship between the DOD and the allowable regenerative power is previously stored in a controller of the vehicle so as to perform the regenerative charge control according to the DOD.

However, in such conventional regenerative charge control systems, there are the following problems:

(1) Due to the secular change of the cell, the characteristic may be shifted from the DOD-allowable regenerative power map stored in the controller;

(2) Since the DOD is derived by integrating the discharge current of the cell, the calculated allowable regenerative power may have a great error due to the operation accuracy of the DOD; and (3) When the building-up time of the charging voltage during the regeneration of the cell is short, the voltage control response may be delayed.

Therefore, it is not possible to optimally perform the regenerative charge control and the regenerative braking control, so that the charging voltage of the cell may exceed the allowable value to hasten the deterioration of the cell.

SUMMARY OF THE INVENTION

It is therefore an object of the present invention to provide a regenerative charge control system which can accurately estimate an allowable regenerative power according to the state of a cell to perform the regenerative charge control.

In order to accomplish the aforementioned and other objects, according to one aspect of the present invention, a regenerative charge control system comprises: a cell; power converting means for converting a discharge power of the cell into a load driving force when the load is driven and for inverting the load driving force into a charging power of the cell when an electric power is regenerated by the load; voltage detecting means for detecting a voltage between both ends of the cell; current detecting means for detecting a current passing through the cell; and control means for measuring a discharge voltage and a discharge current of the cell by the voltage detecting means and the current detecting means, respectively, when the load is driven, the control means estimating an allowable regenerative power when the electric power is regenerated on the basis of the measured results of the discharge voltage and the discharge current, and the control means controlling the charging power of the cell when the electric power is regenerated, so as not to exceed the allowable regenerative power.

In this case, the discharge voltage and the discharge current of the cell may be measured when the discharge power of the cell is converted into the load driving force to drive the load. On the basis of the measured results, the allowable regenerative power when the power is regenerated may be estimated, and the charging power of the cell when the power is regenerated may be controlled so as not to exceed the allowable regenerative power.

According to this regenerative charge control system, the discharge power of the cell is converted into the load driving force to measure the discharge voltage and the discharge current when the load is driven, the allowable regenerative power when the power is regenerated by the load is estimated on the basis of the measured results of the discharge voltage and the discharge current, and the charging power of the cell when the power is regenerated is controlled so as not to exceed the allowable regenerative power. Therefore, it is possible to accurately estimate the allowable regenerative power according to the state of the cell such as the DOD and the temperature of the cell, and it is possible to optimally perform the regenerative charge control and the regenerative braking control according to the state of the cell.

The control means may be designed to measure the discharge voltage and the discharge current in view of a reaction stage of the cell. When the discharge voltage and the discharge current are measured in view of a reaction stage of the cell, it is possible to measure the discharge voltage and the discharge current on the stable condition while avoiding the measurement in the unstable transient region wherein the state of the cell varies abruptly, and it is possible to accurately estimate the allowable regenerative power on the basis of the measured results.

The control means may be designed to measure the discharge voltage and the discharge current after a predetermined period of time after both of the current I passing through the cell and a rate of change dI/dt of the current to time are positive assuming that the discharge current out of the current passing through the cell is positive. When the discharge voltage and the discharge current are measured after a predetermined period of time after both of the current I passing through the cell and a rate of change dI/dt of the current to time are positive assuming that the discharge current out of the current passing through the cell is positive, it is possible to measure the discharge voltage and the discharge current in a stable diffusion region while avoiding the measurement in an unstable transient region wherein the state of the cell varies abruptly, and it is possible to accurately estimate the allowable regenerative power, in view of time necessary to maintain the instantaneous output of the motor, on the basis of the measured results.

The control means may be designed to divide the range of the discharge current of the cell into a plurality of regions, to store a predetermined number of the newest discharge voltage and the newest discharge current for every divided current region, and to perform the linear regression of the voltage-current characteristics of the cell on the basis of the stored discharge voltage and discharge current so as to estimate the allowable regenerative power. When the range of the discharge current of the cell is divided into a plurality of regions to store a predetermined number of the newest discharge voltage and the newest discharge current for every divided current region to perform the liner regression of the voltage-current characteristics of the cell on the basis of the stored discharge voltage and discharge current so as to estimate the allowable regenerative power, it is possible to prevent the linear regression of the V-I characteristics of the cell on the basis of the measured data concentrated on a specific divided current region, and it is possible to accurately perform the linear regression on the basis of the measured data in a wide range of discharge voltage and discharge current so as to accurately estimate the allowable regenerative power.

The control means may be designed to estimate the allowable regenerative power on the basis of the discharge voltage and the discharge current in at least three divided current regions. When the allowable regenerative power is estimated on the basis of the discharge voltage and the discharge current in at least three divided current regions, it is possible to prevent the linear regression of the V-I characteristics of the cell on the basis of the measured data concentrated on a specific divided current region, and it is possible to accurately perform the linear regression on the basis of the measured data in a wide range of discharge voltage and discharge current so as to further accurately estimate the allowable regenerative power.

The control means may be designed to estimate the allowable regenerative power on the basis of the discharge voltage and the discharge current which are measured whenever the quantity of discharge electricity or the electric energy is a predetermined quantity. When the allowable regenerative power is estimated on the basis of the measured results of discharge voltage and discharge current which are measured whenever the quantity of discharge electricity or the electric energy is a predetermined quantity, it is possible to measure the discharge voltage and the discharge current in the newest condition of the cell, and it is possible to accurately estimate the allowable regenerative power in the newest state of the cell.

The control means may be designed to eliminate all the measured discharge voltage and discharge current after estimating the allowable regenerative power, to newly measure discharge voltage and discharge current. When all the measured discharge voltage and discharge current are eliminated after estimating the allowable regenerative power to newly measure discharge voltage and discharge current, it is possible to accurately estimate the allowable regenerative power on the basis of the discharge voltage and the discharge current in the newest state of the cell.

The cell may be a lithium ion cell or a nickel-hydrogen cell. When a lithium ion cell or a nickel-hydrogen cell is used, it is possible to accurately estimate the allowable regenerative power according to the state of the cell such as the DOD and the temperature of the cell, by utilizing the characteristics of the lithium ion cell that the internal resistance during the charge of the cell is substantially the same as that during the discharge of the cell when the DOD is low and that the linearity of the voltage-current characteristics during the charge and discharge of the cell is good.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENT

Figure 1:
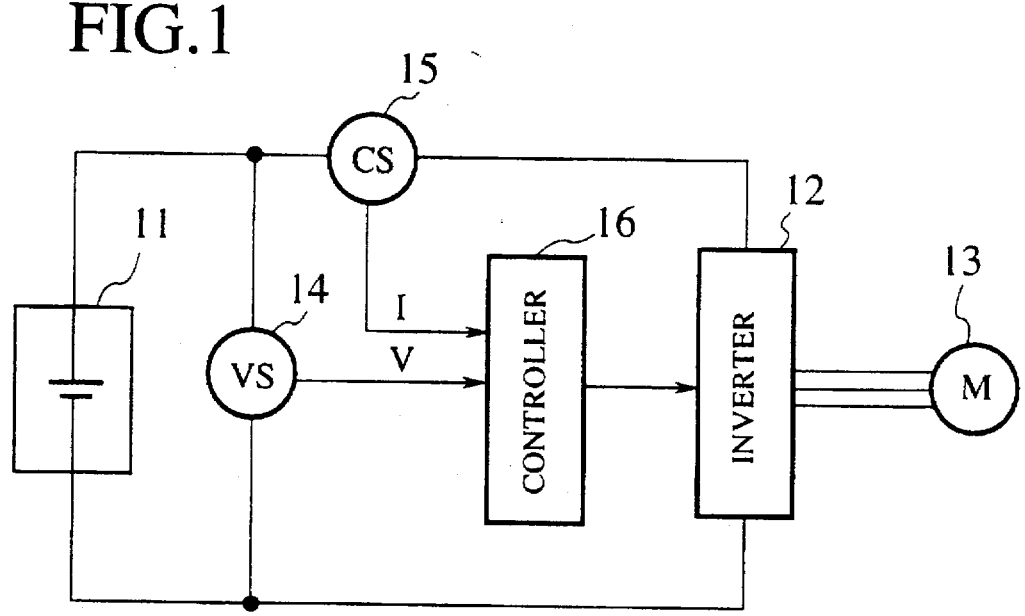
FIG. 1 is a block diagram of the preferred embodiment of a regenerative charge control system according to the present invention.

Referring now to the drawings, particularly to the preferred embodiment of a regenerative charge control system applied to an electric automotive vehicle, according to the present invention, will be described below. Furthermore, the present invention should not limited to the application to an electric automotive vehicle, but the invention can be applied to any system for charging a cell by a regenerative power.

FIG. 1 is a block diagram of the preferred embodiment of a regenerative charge control system according to the present invention. Direct-current power is supplied from a cell 11 to an inverter 12, by which the direct-current power is converted into alternating-current power to produce the traveling energy of an automotive vehicle. When the electric power is regenerated, the traveling energy of the vehicle is inverted to an electrical energy via a motor 13 and the inverter 12 so as to charge the cell 11 and to apply the regenerative braking to the vehicle.

A voltage sensor 14 detects the voltage V between both ends of the cell 11, and a current sensor 15 detects the current I passing through the cell 11. Furthermore, it is assumed that the direction of the current I passing from the cell 11 to the inverter 12 when the motor is driven is positive, and the direction of the current I passing from the inverter 12 to the cell 11 when the regenerative charge is performed is negative.

A controller 16 performs the regenerative charge control on the basis of the voltage V and the current I which are detected by the voltage sensor 14 and the current sensor 15, respectively.

Furthermore, while the inverter 12 has been used as voltage converting means in this preferred embodiment, the voltage converting means should not be limited to the inverter, and, for example, a converter capable of converting and inverting the power may be used.

A method for operating an allowable regenerative power according to the present invention will be described below.

Figure 2:
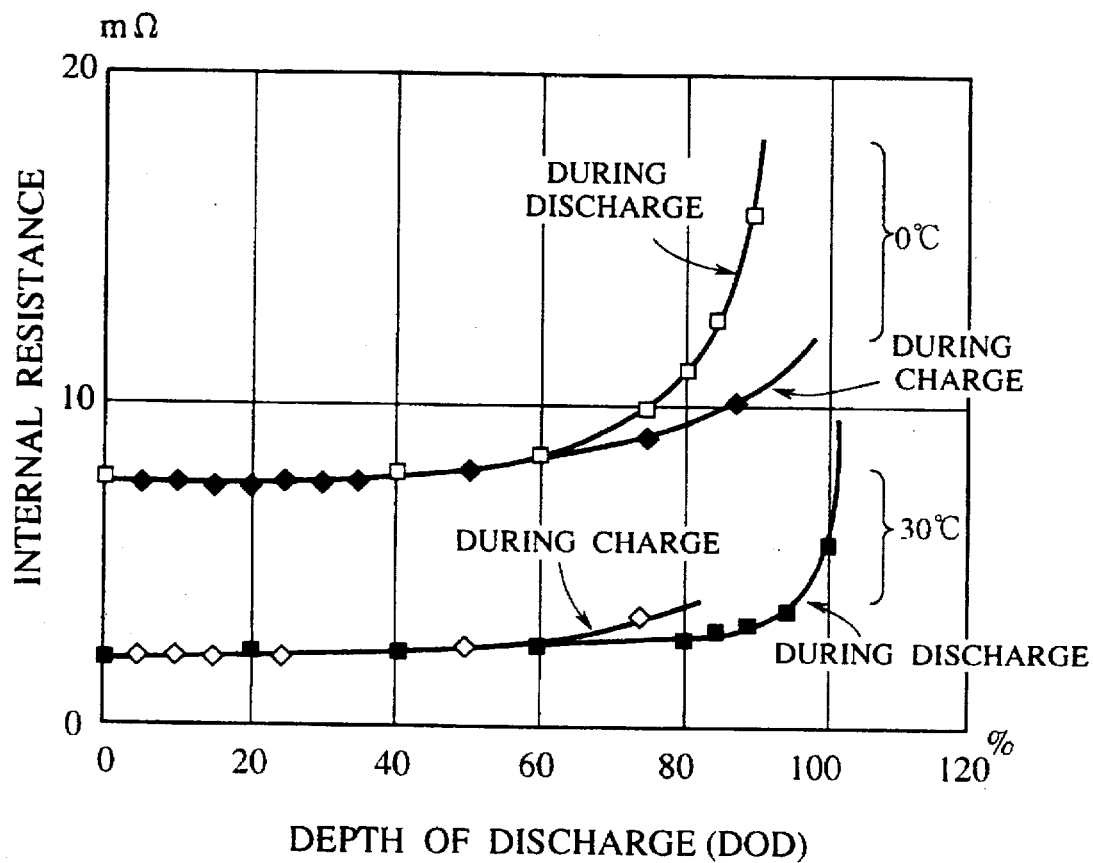
FIG. 2 is a graph showing the relationship between the depth of discharge (DOD) and the internal resistance of a cell.

A cell of a certain type, for example, a lithium ion cell or a nickel-hydrogen cell, has the following characteristics:

(1) As shown in FIG. 2, when the DOD is low (~60%), the internal resistance during the charge of the cell is substantially the same as that during the discharge of the cell; and (2) The linearity of the voltage-current characteristics (the V-I characteristics) during the charge and discharge of the cell is good.

If such characteristics of a cell of this type are utilized, it is possible to accurately estimate the allowable regenerative power according to the state of the cell such as the DOD and the temperature of the cell.

Furthermore, the cell should not be limited to the lithium ion cell and the nickel-hydrogen cell, but any cells having the aforementioned characteristics may be used.

A method for estimating an allowable regenerative power will be described below.

Figure 3:
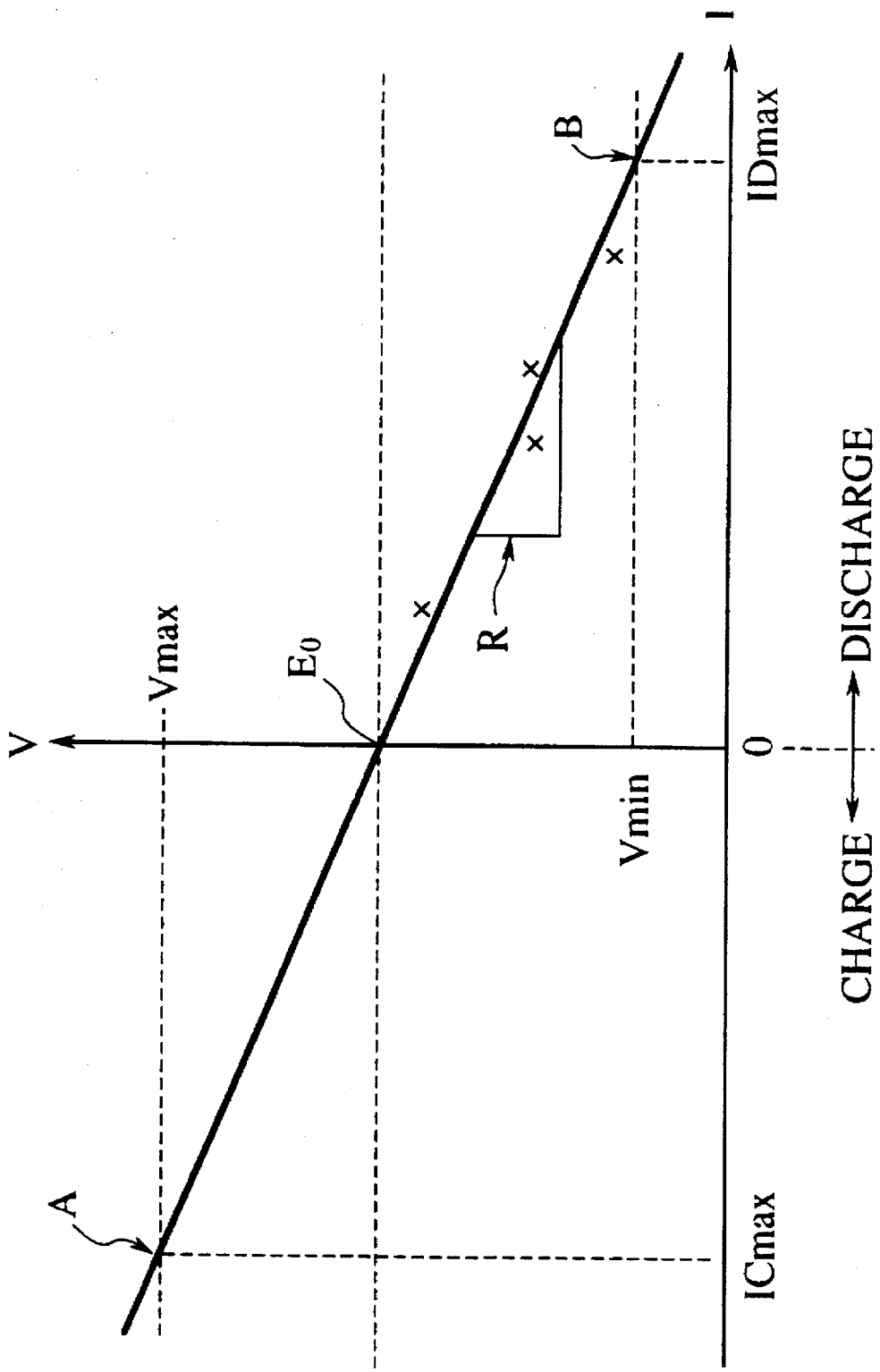
FIG. 3 is a view illustrating a method for operating an allowable regenerative power by the sampling data of the voltage V and the current I during the discharge of the cell.

As shown in FIG. 3, the sampling of the V-I characteristics during the discharge of the cell is first performed (expressed by x in FIG. 3). As mentioned above, since the cell of this type has substantially the same internal resistance during the charge and discharge of the cell and since the linearity of the V-I characteristics is good, the linear regression of the V-I characteristics in the sampling results can be performed, and the linear regression can be extended to the sides of the charge and discharge of the cell. In this figure, the V-intercept E0 of the regression line indicates the open-circuit voltage of the cell, and the gradient of the regression line indicates the internal resistance R. Therefore, the regression line can be expressed by the following formula.

$$V = E_0 - I.R \tag{1}$$

In addition, the current ICmax at the intersection point A of the regression line and the maximum allowable voltage Vmax during the charge of the cell gives a regenerative allowable value, and the following formula can be formed at the intersection point A.

$$Vmax = E_0 - ICmax.R \tag{2}$$

Similarly, the current IDmax at the intersection point B of the regression line and the minimum allowable voltage Vmin during the discharge of the cell gives an output allowable value, and the following formula can be formed at the intersection point B.

$$Vmin = E_0 - IDmax.R \tag{3}$$

Therefore, from formula (2), allowable regenerative power PC can be expressed as follows.

$$PC = Vmax.ICmax = Vmax.(E_0 - Vmax)/R \tag{4}$$

From formula (3), allowable discharge power PD can be expressed as follows.

$$PD = Vmin.IDmax = Vmin.(E_0 - Vmin)/R \tag{5}$$

The sampling values in the V-I characteristics during the discharge of the cell are values depending upon the state of the cell such as the DOD and the temperature of the cell. The allowable regenerative power PC and the allowable discharge power PD thus obtained by the linear regression of the sampling values naturally depend upon the state of the cell such as the DOD and the temperature of the cell.

Furthermore, in the aforementioned operation of the allowable regenerative power PC, it was assumed that the DOD of the cell was 60% or less as shown in FIG. 2. When the DOD exceeds 60%, the internal resistance during the charge of the cell is different from that during the discharge of the cell to increase the error due to the linear regression, so that the calculated allowable regenerative power PC includes an error.

However, when the DOD of the cell exceeds 60%, the discharge of the cell is sufficiently performed. Therefore, there is no problem even if the estimated allowable regenerative power PC has an error in some degree.

A method for sampling the V-I characteristics of the cell during the discharge of the cell will be described below.

The relationship between the voltage V and the current I of the cell can be expressed by the aforementioned formula (1). However, the internal resistance R of the cell depends upon the DOD, and it has a great transient variation to be unstable.

Figure 4:
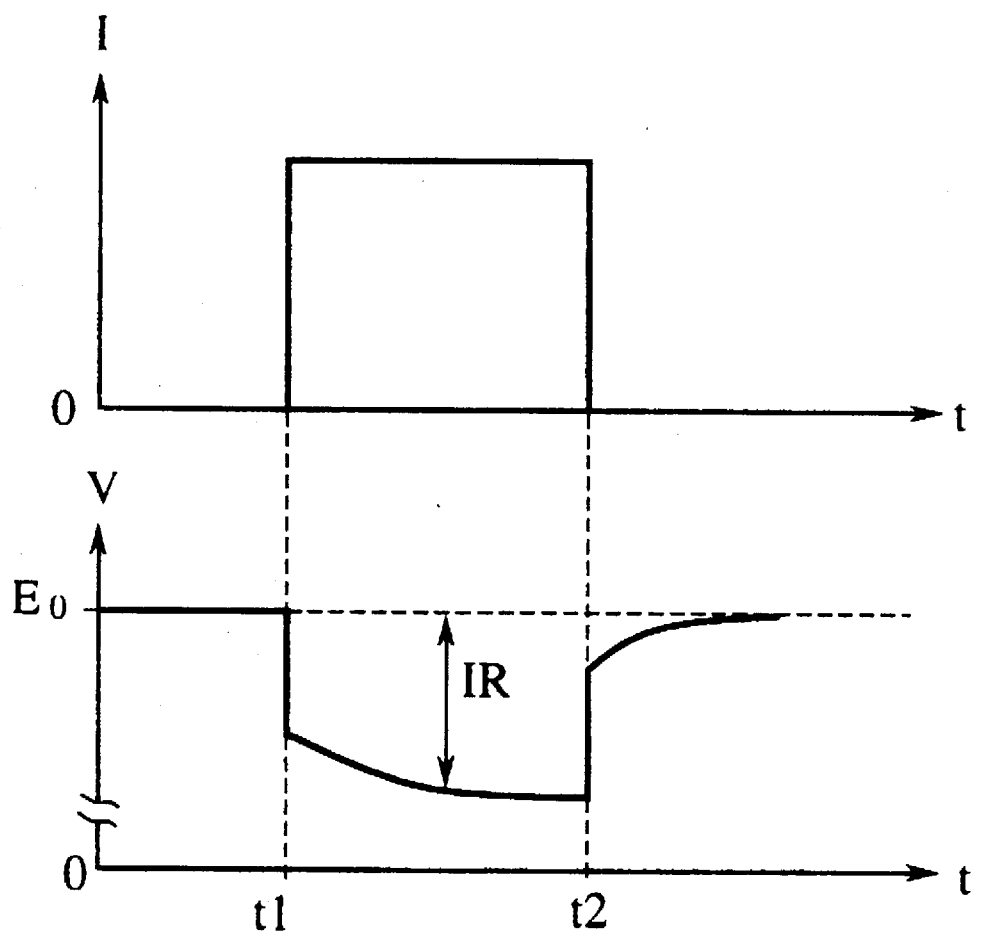
FIG. 4 is a view illustrating the variation of the voltage V when the discharge current I of the cell is varied stepwise.

FIG. 4 shows the variation of the voltage V when the discharge current I of the cell is varied stepwise. When the discharge of the cell is started at time t1, the voltage V is abruptly decreased due to the internal resistance R, and then, it is gradually decreased to be stabilized. In the transient region of the reaction wherein the voltage V is abruptly decreased, the voltage V is varied by the internal resistance (such as the charge-transfer resistance and the contact resistance) to be unstable. The region after this transient region is called a diffusion region wherein the voltage V is relatively stabilized.

That is, even if the sampling of voltages is performed at the same current, the same voltage can not be obtained if the reaction stage is different. Similarly, even if the sampling of currents at the same voltage, the same current can not be obtained if the reaction stage is different.

Thus, since the voltage V and the current I fluctuate according to the stage of the chemical reaction in the cell itself, it is required to sample the V-I characteristics in view of the reaction stage of the cell in order to accurately estimate the capacity of the cell according to the time necessary to maintain the instantaneous output of the motor for an automotive vehicle.

Figure 5:
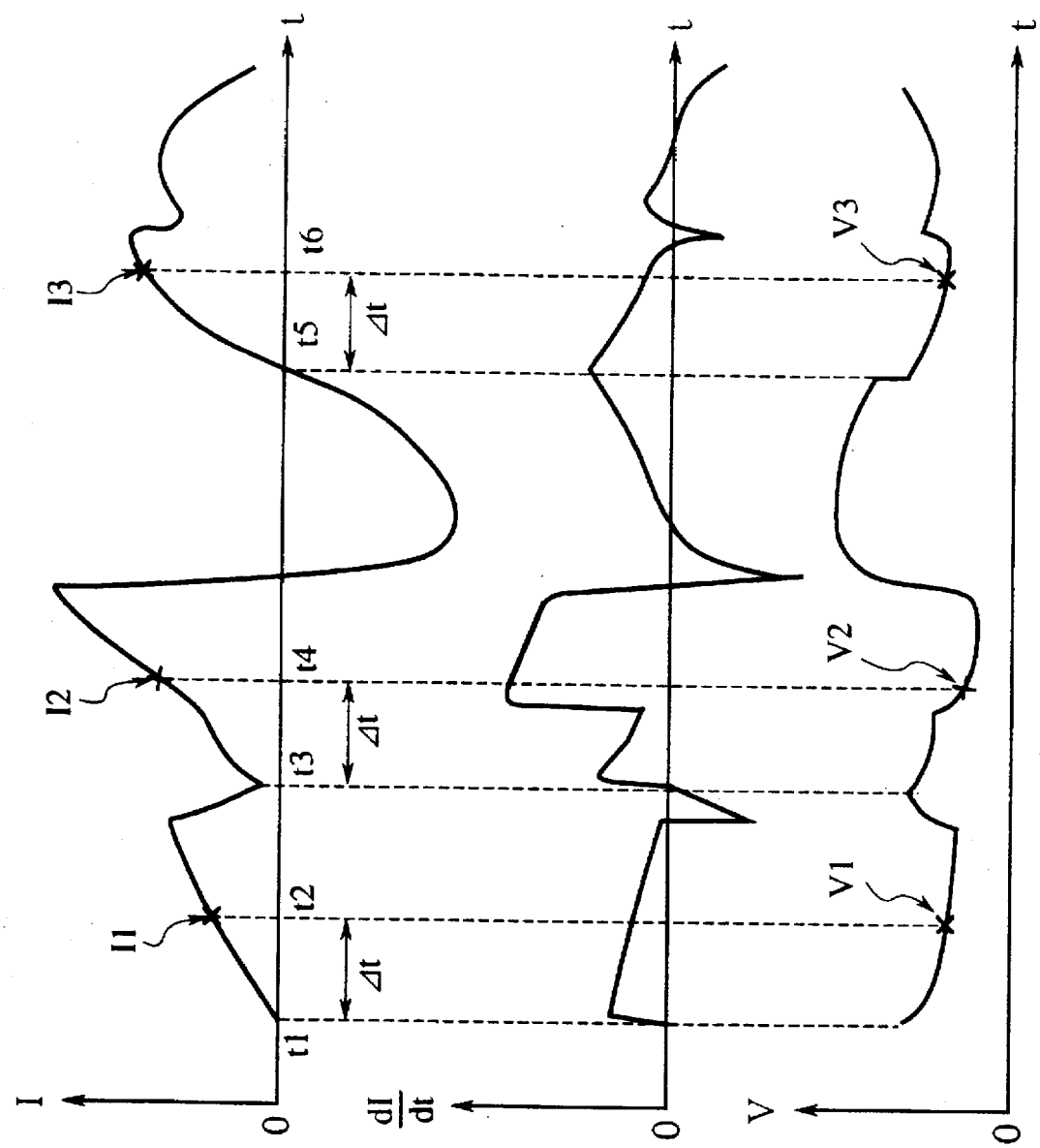
FIG. 5 is a view illustrating the sampling timing of the voltage V and the current I during the discharge of the cell.

FIG. 5 is a view illustrating the sampling timing of the voltage V and the current I during the discharge of the cell.

In the data collection, in order to remove the transient phenomena between different reaction forms, such as from the discharge reaction to the charge reaction or from the discharge reaction to the discharge stop, only the building-up of the discharge reaction is detected, and the sampling of voltages V and currents I during the discharge reaction is performed. Moreover, in order to avoid the data collection on the unstable stage in the transient region and in order to decrease the difference of the resistance R varying in the diffusion region, the sampling of voltages V and currents I is performed at a predetermined time after the building-up of the discharge reaction.

It is assumed that the building-up points of the discharge reaction are points of time at which both of the current I and its rate of change dI/dt are positive. In the example of FIG. 5, there are the starting points of the discharge reaction at times t1, t3 and t5, and the voltages V1, V2 and V3 and the currents I1, I2 and I3 are sampled at times t2, t4 and t6 which are elapsed by a predetermined time Δt after the respective starting points.

Thus, it is possible to measure the discharge voltage and the discharge current of the cell in the stable diffusion region while avoiding the measurement in the unstable transient region wherein the state of the cell varies abruptly, and on the basis of the results of the measurement, it is possible to accurately estimate the allowable regenerative power PC.

Furthermore, in the sampling of the V-I characteristics, when the starting condition of the discharge reaction is newly formed within a predetermined time after the building-up of the discharge reaction, the timer is newly started from that time, and the sampling of voltages V and currents I is performed after a predetermined elapsed time.

The data sampled at the aforementioned timing is stocked in the following method.

Figures 6, 7:
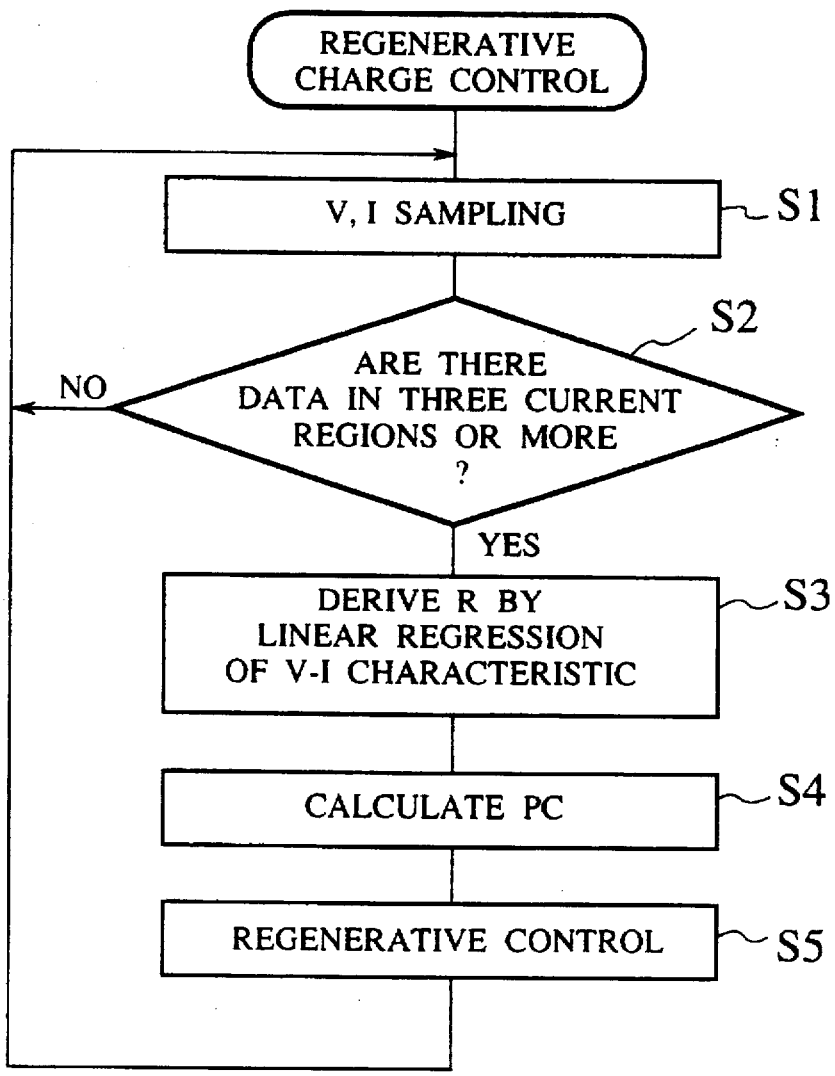
FIG. 6 is a table illustrating a method for stocking the sampling data.
FIG. 7 is a flow chart of a regenerative charge control program in the preferred embodiment of a regenerative charge control system according to the present invention.

The range of the discharge current is divided into a plurality of regions, and a predetermined number of stock memories are prepared for each of the regions. For example, as shown in FIG. 6, the range of the discharge current is divided into five regions, and three stock memories are prepared for each of the regions. During a predetermined sampling period of time, currents in and voltages vn (n is a sampling order) are sampled at the aforementioned timings to be classified for each of the current regions to be stocked therein. When the number of the data in the current region reaches a predetermined number, the oldest data are eliminated and the newest data are stocked therein. For example, in the example of FIG. 6, the data on (i8, v8) are sampled, and when these data are included in regions I2 through I3, the oldest data (i3, v3) in the regions are eliminated and the newest data (i8, v8) are stored therein.

According to this stock method of the sampling data, since only a predetermined number of data sufficient for the primary regression are stocked for each of the divided current regions, it is possible to avoid the linear regression of the V-I characteristics on the basis of the sampling data concentrating on a specific divided current region, so that it is possible to accurately perform the linear regression on the basis of the sampling data over a wide range of discharge voltage and discharge current so as to accurately estimate the allowable regenerative power PC. In addition, since the predetermined number of sampling data are stocked every divided current region, it is possible to accurately perform the linear regression using a wide range of sampling data within the region of discharge current so as to accurately estimate the allowable regenerative power PC, and it is not required to secure an extensive memory capacity in the controller.

The sampling of the V-I characteristics is performed within a predetermined period of time or every predetermined amount of discharge, and it is collected within a predetermined period of time to estimate the allowable regenerative power PC as mentioned above on the basis of the data stocked in the aforementioned method. After the processing for estimating the allowable regenerative power PC is completed, all the sampling data stocked in the memory are eliminated, and then, data are newly stocked for the next sampling period of time. Thus, it is possible to sample the discharge voltage and the discharge current in the newest state of the cell, and it is possible to accurately estimate the allowable regenerative power PC on the basis of the sampling data in the newest state of the cell. The PC obtained in time series can be processed by a digital filter, for example, the moving average, so as to enhance the estimation accuracy.

FIG. 7 is a flow chart of a regenerative charge control program executed by the controller 16 of the preferred embodiment of a regenerative charge control system according to the present invention. Referring to this flow chart, the operation of the preferred embodiment of a regenerative charge control system according to the present invention will be described below.

This control program is repeatedly executed by the controller 16 while the electric automotive vehicle is running. At step 1, voltages V and currents I are sampled at the aforementioned timings within a predetermined period of time or within a predetermined quantity of electricity and a predetermined electric energy, and then, the sampling data are stocked in the aforementioned method. After the sampling is completed, it is determined at step 2 as to whether the sampling data are stocked in three divided current regions or more in order to prevent the regression operation in a narrow current region so as to enhance the estimation accuracy.

When the sampling data are stocked in three divided current regions or more, the routine goes to step 3 wherein the linear regression of the V-I characteristics is performed on the basis of the stocked data to calculate an internal resistance R on the basis of the gradient of the line. On the other hand, when it is determined at step 2 that the sampling data are not stocked in three divided current regions or more, the operation of the PC is not performed (not renewed).

Then, at step 4, a current ICmax at the maximum allowable voltage is derived by the linear regression, and an allowable regenerative power PC is derived by the aforementioned formula (4). Then, at step 5, the calculated allowable regenerative power PC is outputted to the inverter 12 (or the controller 13), and the regenerative power is so controlled as to be not more than the allowable regenerative power PC.

What is claimed is:

1. A regenerative charge control system comprising:
   a cell;
   power converting means for converting a discharge power of said cell into a load driving force when the load is driven, and for inverting said load driving force into a charging power of said cell when an electric power is regenerated by said load;
   voltage detecting means for detecting a voltage between both ends of said cell;
   current detecting means for detecting a current passing through said cell; and
   control means for measuring a discharge voltage and a discharge current of said cell by said voltage detecting means and said current detecting means, respectively, when said load is driven, said control means estimating an allowable regenerative power when the electric power is regenerated on the basis of the measured results of said discharge voltage and said discharge current, and said control means controlling the charging power of said cell when the electric power is regenerated, so as not to exceed said allowable regenerative power.

2. A regenerative charge control system as set forth in claim 1, wherein said control means measures said discharge voltage and said discharge current at a predetermined reaction stage of said cell.

3. A regenerative charge control system as set forth in claim 2, wherein said control means measures said discharge voltage and said discharge current after a predetermined period of time after both the current passing through said cell and a rate of change of the current with respect to time dI/dt are positive assuming that the discharge current out of the current passing through said cell is positive.

4. A regenerative charge control system as set forth in claim 1, wherein said control means divides said discharge current of said cell into a plurality of regions, stores a predetermined number of the newest measured discharge voltage and the newest measured discharge current at every divided current region, and performs a linear regression of the voltage-current characteristics of said cell on the basis of the stored discharge voltage and discharge current so as to estimate said allowable regenerative power.

5. A regenerative charge control system as set forth in claim 4, wherein said control means estimates said allowable regenerative power on the basis of the stored discharge voltage and the discharge current in at least three divided current regions.

6. A regenerative charge control system as set forth in claim 1, wherein said control means estimates said allowable regenerative power on the basis of the discharge voltage and the discharge current which are measured whenever the quantity of discharge electricity or the electric energy is a predetermined quantity.

7. A regenerative charge control system as set forth in claim 6, wherein said control means eliminates all the measured discharge voltage and discharge current after estimating the allowable regenerative power to newly measure the discharge voltage and the discharge current.

8. A regenerative charge control system as set forth in claim 1, wherein said cell is a lithium ion cell or a nickel-hydrogen cell.

9. A method for charging a cell comprising steps of:
measuring a discharge voltage of said cell;
measuring a discharge current of said cell;
estimating an allowable regenerative power based on the measured discharge voltage and the measured discharge current; and
controlling a charging power of said cell so as not to exceed said allowable regenerative power.

10. A method as set forth in claim 9, wherein the step of measuring includes the step of measuring the discharge voltage and the discharge current at a predetermined reaction stage of said cell.

11. A method as set forth in claim 10, wherein the step of measuring further includes the step of measuring the discharge voltage and the discharge current after a predetermined period of time after both the current passing through the cell and the rate of change of the current with respect to time (dI/dt are positive.

12. A method as set forth in claim 9, further comprising the steps of:
classifying the discharge and current measurements with respect to the discharge current measurement;
storing a predetermined number of the most recent discharge voltage and current measurements into appropriate current regions, each region representing a range of the discharge current; and
performing a linear regression of the voltage-current characteristics of said cell on the basis of the stored discharge voltage and current so as to estimate said allowable regenerative power.

13. A method as set forth in claim 12, wherein the step estimating includes estimating the allowable regenerative power on the basis of the stored discharge voltage and current measurements in at least three current regions.

14. A method as set forth in claim 9, wherein the step of estimating includes the step of estimating the allowable regenerative power on the basis of the discharge voltage and current which are measured whenever the quantity of discharge electricity or the electric energy is a predetermined quantity.

15. A method as recited in claim 14, further comprising the step of discarding all the measured discharge voltage and current after the step of estimating to permit new measurements of the discharge voltage and current.

* * * * *